United States Patent
Shi et al.

(10) Patent No.: US 10,477,532 B2
(45) Date of Patent: Nov. 12, 2019

(54) METHOD AND APPARATUS FOR SENDING AND RECEIVING DOWNLINK CONTROL CHANNEL

(71) Applicant: ZTE CORPORATION, Shenzhen, Guangdong (CN)

(72) Inventors: Jing Shi, Shenzhen (CN); Xianming Chen, Shenzhen (CN); Bo Dai, Shenzhen (CN); Shuqiang Xia, Shenzhen (CN); Wen Zhang, Shenzhen (CN); Kun Liu, Shenzhen (CN); Huiying Fang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/751,366

(22) PCT Filed: Jul. 27, 2016

(86) PCT No.: PCT/CN2016/091876
§ 371 (c)(1),
(2) Date: Feb. 8, 2018

(87) PCT Pub. No.: WO2017/024941
PCT Pub. Date: Feb. 16, 2017

(65) Prior Publication Data
US 2018/0234952 A1    Aug. 16, 2018

(30) Foreign Application Priority Data
Aug. 11, 2015  (CN) .......................... 2015 1 0490763

(51) Int. Cl.
*H04W 72/04*  (2009.01)
*H04L 5/00*  (2006.01)
(Continued)

(52) U.S. Cl.
CPC ......... *H04W 72/042* (2013.01); *H04L 5/0053* (2013.01); *H04L 5/0073* (2013.01);
(Continued)

(58) Field of Classification Search
CPC ........... H04W 72/042; H04W 72/1289; H04W 72/1273; H04W 72/1278; H04W 4/70; H04W 48/12; H04W 74/006
See application file for complete search history.

(56) References Cited

U.S. PATENT DOCUMENTS 10,257,834 B2 *  4/2019  Webb ................... H04L 1/0038
10,334,418 B2 *  6/2019  Park ....................... H04W 4/70
(Continued)

FOREIGN PATENT DOCUMENTS

CN    103326841 A    9/2013
CN    103457688 A    12/2013
(Continued)

OTHER PUBLICATIONS

Supplementary European Search Report in European application No. 16834565.0, dated Jul. 19, 2018, 9 pgs.
(Continued)

*Primary Examiner* — Warner Wong
(74) *Attorney, Agent, or Firm* — Cooper Legal Group, LLC

(57) ABSTRACT

Disclosed are a method and an apparatus for sending and receiving a downlink control channel. The method comprises: a base station determines position(s) of one or more search spaces according to at least one of a coverage level and a message type, and sends a downlink control channel in the search space, the coverage level comprising at least a non-coverage enhanced level (CE0) and coverage enhanced levels (CE1, CE2, CE3), the message type comprising at least random access response (RAR), paging, radio resource
(Continued)

control (RRC), and transmission power control (TPC); the search space comprising: a collective search space (CSS), a dedicated search space (dedicated SS), and a non-user search space (non-USS); and the position of the search space comprising: a narrow-band/frequency domain position, a time domain position, and a set position.

17 Claims, 6 Drawing Sheets

(51) Int. Cl.
    *H04W 72/12* (2009.01)
    *H04W 74/00* (2009.01)
    *H04W 4/70* (2018.01)
    *H04W 88/08* (2009.01)

(52) U.S. Cl.
    CPC .......... *H04L 5/0085* (2013.01); *H04W 72/04* (2013.01); *H04W 72/1289* (2013.01); *H04W 4/70* (2018.02); *H04W 74/006* (2013.01); *H04W 88/08* (2013.01)

(56) References Cited

U.S. PATENT DOCUMENTS

| | | | |
|---|---|---|---|
| 2009/0088148 A1* | 4/2009 | Chung | H04L 5/0007 455/423 |
| 2012/0008591 A1 | 1/2012 | Miki | |
| 2012/0063401 A1 | 3/2012 | Xue | |
| 2012/0182950 A1* | 7/2012 | Chung | H04L 5/0053 370/329 |
| 2014/0086202 A1* | 3/2014 | Nagata | H04W 72/042 370/330 |
| 2014/0133331 A1* | 5/2014 | Fu | H04L 5/00 370/252 |
| 2015/0131579 A1* | 5/2015 | Li | H04L 1/08 370/329 |
| 2015/0237604 A1* | 8/2015 | Shi | H04W 72/042 370/330 |
| 2016/0183231 A1* | 6/2016 | Shi | H04W 72/0446 370/329 |
| 2016/0192333 A1* | 6/2016 | Wang | H04W 4/70 370/329 |
| 2016/0205571 A1* | 7/2016 | Yi | H04L 1/1812 370/252 |
| 2016/0212727 A1* | 7/2016 | Hu | H04W 68/025 |
| 2016/0302174 A1* | 10/2016 | Chatterjee | H04B 7/0486 |
| 2016/0338018 A1 | 11/2016 | Awad et al. | |
| 2016/0345117 A1* | 11/2016 | Nguyen | H04W 4/70 |
| 2017/0013570 A1* | 1/2017 | Vajapeyam | H04W 52/365 |
| 2017/0230951 A1* | 8/2017 | Xiong | H04W 4/70 |
| 2017/0272225 A1* | 9/2017 | Gao | H04W 16/26 |
| 2017/0273113 A1* | 9/2017 | Tirronen | H04W 4/70 |
| 2017/0303247 A1* | 10/2017 | Yasukawa | H04W 72/042 |
| 2018/0014283 A1* | 1/2018 | You | H04L 5/0094 |
| 2018/0084561 A1* | 3/2018 | Liu | H04L 1/00 |
| 2018/0103459 A1* | 4/2018 | Liu | H04L 5/0057 |
| 2018/0249508 A1* | 8/2018 | Gao | H04L 5/0053 |
| 2018/0279101 A1* | 9/2018 | Rico Alvarino | H04L 5/0053 |

FOREIGN PATENT DOCUMENTS

| | | |
|---|---|---|
| CN | 103457711 A | 12/2013 |
| CN | 104202828 A | 12/2014 |
| CN | 104349458 A | 2/2015 |
| CN | 104604315 A | 5/2015 |
| CN | 104780549 A | 7/2015 |
| WO | 2015115579 A1 | 8/2015 |

OTHER PUBLICATIONS

"Physical Downlink Control Channel for MTC", May 2015, Nokia Networks, 3GPP TSG-RAN WG1 Meeting #81, R1-152540, 3rd Generation Partnership Project (3GPP), Mobile Competence Centre, 650, Route Des Lucioles, Sophia-Antipolis Cedes, France, vol. RAN WG1, No. Fukuoka, Japan; Retrieved from the Internet:URL:http://www.3gpp.org/ftp/Meetings 3GPP SYNC/RAN1 Docs/, 4 pgs.

"Discussion on Data and Control Channel Enhancement for eMTC", Oct. 2014, 3GPP TSG RAN WG1 Meeting #78bis, R1-143771—INTEL EMTC Data Control Channel, 3rd Generation Partnership Project, (3GPP), Mobile Competence Centre; 650, Route Des Lucioles, F-06921 Sophia-Antipolis Cedex France, vol. RAN WG1, No. Ljubljana, Slovenia; Retrieved from the Internet:URL:http://www.3gpp.org/ftp/Meetings 3GPP SYNC/RAN1/Docs/ [retrieved on Oct. 5, 2014] , 6 pgs.

"Discussion on Resource Configuration for Low Complexity MTC UEs", May 2015, 3GPP TSG RAN WG1 Meeting #81, R1-152696 Configuration, 3rd Generation Partnership Project, (3GPP), Mobile Competence Centre; 650, Route Des Lucioles, F-06921 Sophia-Antipolis Cedex France, vol. RAN WG No. Fukuoka, Japan; Retrieved from the Internet:URL:http://www.3gpp.org/ftp/Meetings 3GPP SYNC/RAN1/Docs/ [retrieved on May 24, 2015], 6 pgs.

English Translation of International Search Report in international application No. PCT/CN2016/091876, dated Oct. 31, 2016, 2 pgs.
English Translation of The Written Opinion of the International Search Authority in international application No. PCT/CN2016/091876, dated Oct. 31, 2016, 6 pgs.

* cited by examiner

METHOD AND APPARATUS FOR SENDING AND RECEIVING DOWNLINK CONTROL CHANNEL

TECHNICAL FIELD

Embodiments of the disclosure relate to, but not limited to the field of wireless communications, and in particular to a method and device for sending and receiving a downlink control channel in a wireless communication system.

BACKGROUND

Machine Type Communication (MTC) User Equipment (UE) is also referred to as Machine to Machine (M2M) user communication equipment, which is a main application form of a current internet of things. Recently, due to high spectrum efficiency of a Long-Term Evolution (LTE)/LTE-Advance (LTE-A) system, more and more mobile operators select LTE/LTE-A as an evolution direction of a broadband wireless communication system. LTE/LTE-A-based MTE multi-variety data services will be more attractive.

The existing LTE/LTE-A system is used for transmission based on dynamic scheduling of each subframe, that is, each subframe may transmit different control channels.

In LTE/LTE-A, a Physical Downlink Control Channel (PDCCH) and an Enhanced Physical Downlink Control Channel (EPDCCH) are defined. Information borne by a Physical Control Format Indicator Channel (PCFICH) is used for indicating the number of Orthogonal Frequency Division Multiplexing (OFDM) symbols for transmitting the PDCCH in a subframe. A Physical Hybrid-Automatic Repeat-reQuest (ARQ) Indicator Channel (PHICH) is used for bearing ACK/NACK feedback information of uplink transmission data. A downlink control channel adopts blind detection, and a terminal attempts to demodulate the downlink control channel with different aggregation levels and candidate sets in a certain Search Space (SS).

TABLE 1

Search space $S_k^{(L)}$

| Type | Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

An existing UE-specific Search Space (USS) and Common Search Space (CSS) are as shown in Table 1 and Table 2. Table 1 is a PDCCH SS, and Table 2 is an EPDCCH SS (one distributed EPDCCH-PRB-set-Case 3).

An SS consists of candidate sets corresponding to different aggregation levels, a terminal needs to attempt to demodulate each candidate set until the candidate sets are demodulated correctly when demodulating a control channel, and otherwise, it is considered that the terminal does not receive own control channels.

TABLE 2

| | Number of EPDCCH candidates $M_p^{(L)}$ for Case 3 | | | | |
|---|---|---|---|---|---|
| $N_{RB}^{X_p}$ | L = 1 | L = 2 | L = 4 | L = 8 | L = 16 |
| 2 | 8 | 4 | 2 | 1 | 0 |
| 4 | 4 | 5 | 4 | 2 | 1 |
| 8 | 4 | 4 | 4 | 2 | 2 |

The EPDCCH is used for bearing Downlink Control Information (DCI), including uplink scheduling information, downlink scheduling information and uplink power control information.

Usually, an MTC terminal may obtain DCI by demodulating the EPDCCH at each subframe, in order to demodulate a Physical Downlink Share Channel (PDSCH) and implement scheduling indication information of a Physical Uplink Share Channel (PUSCH).

MTC application terminals are distinguished into at least two types of terminals, namely low-cost terminals called due to limited radio frequency receiving bandwidth, and coverage enhancement terminals called due to significant reduction of coverage performance caused by limited position or characteristics of the present terminal. For example, most of smart meter reading type MTC terminals are fixedly installed in a low coverage performance environment such as a basement, and are mainly used for sending packet data, a data rate is lowly required, and a large data transmission delay can be tolerated. Correct data transmission for a coverage enhancement terminal is ensured in a manner of repeated sending on a time domain. Due to limited receiving bandwidth, only the EPDCCH can be used. When DCI of a unicast service is repeatedly transmitted and scheduled, even if USS resources of all of six Physical Resource Blocks (PRB) can be occupied, the resources can be configured to different narrowband positions by means of an evolved Node B (eNB). When DCI of a common message is repeatedly transmitted and scheduled, a piece of DCI in each subframe needs to occupy all 6PRB resources of an SS, and in this case, other common messages cannot be scheduled. Therefore, it is necessary to consider one or more possible CSSs or USSs for low-cost and/or coverage enhancement MTC terminals.

Any effective solution has not been proposed yet at present for the problem in the related art about how to determine the quantity and positions of SSs for low-cost and coverage enhancement MTC terminals.

SUMMARY

The embodiments of the disclosure provide a method and device for sending and receiving a downlink control channel, capable of at least ensuring sufficient using resources of DCI for scheduling different common messages and avoiding a large delay caused by time-sharing transmission of different common messages.

The following is a brief introduction for a subject described herein in detail. The brief introduction is not intended to restrict the scope of protection of claims.

An embodiment of the disclosure provides a method for sending a downlink control channel. The method, applied to a base station, includes the steps as follows.

One or more SS positions are determined according to at least one of a coverage level and a message type, and a downlink control channel is sent in an SS.

Herein, the coverage level at least includes a non-coverage enhancement level (CE0) and coverage enhancement levels (CE1, CE2 and CE3), the message type at least includes Random Access Response (RAR), Paging, Radio Resource Control (RRC) and Transmission Power Control (TPC), the SS includes a CSS, a dedicated SS and a non-USS, and the SS position includes a narrowband/frequency domain position, a time domain position and a set position.

In the embodiment of the disclosure, the method may further include the step as follows.

The SS position is sent to a terminal by means of a predefined manner or a System Information Block (SIB) information configuration manner.

In the embodiment of the disclosure, the operation of determining an SS position according to a coverage level includes the following operations:

CE1, CE2 and CE3 use respective SS positions; or

CE1, CE2 and CE3 use the same SS position; or

CE1 and CE2 use a first SS position, and CE3 uses a second SS position.

In the embodiment of the disclosure, the operation of determining an SS position according to a coverage level may further include the operations as follows.

When CE1, CE2 and CE3 use respective SS positions, CE0 uses a fourth SS position or shares the same SS position with one of CE1, CE2 and CE3.

When CE1, CE2 and CE3 use the same SS position, CE0 uses a fourth SS position or shares the same SS position with CE1, CE2 and CE3.

When CE1 and CE2 use a first SS position and CE3 uses a second SS position, CE0 uses a fourth SS position or one of the first SS position and the second SS position.

Herein, any two different SS positions at least contain non-identical PRB resources.

In the embodiment of the disclosure, the operation of determining an SS position according to a coverage level may further include the following operations:

different message types use respective SS positions, and different coverage levels of the same message type also use respective SS positions; or different message types use respective SS positions, and different coverage levels of the same message type use the same SS position.

In the embodiment of the disclosure, the operation of determining an SS position according to a message type includes the following operations:

different message types use respective SS positions; or all message types use the same SS position; or some of the message types use the same SS position.

In the embodiment of the disclosure, the operation of determining an SS position according to a message type may further include the following operations:

different coverage levels use respective SS positions, and different message types in the same coverage level use respective SS positions; or different coverage levels use respective SS positions, and different message types in the same coverage level use the same SS position; or different coverage levels use respective SS positions, and some of the message types in the same coverage level use the same SS position; or different coverage levels use the same SS position, and different message types use respective SS positions; or different coverage levels use the same SS position, and different message types use the same SS position; or different coverage levels use the same SS position, and some of the message types use the same SS position.

In the embodiment of the disclosure, when the message type is an RAR, the method may further include the steps as follows.

During mixed transmission of an RAR message corresponding to different coverage levels, an SS corresponding to DCI for scheduling the RAR message is located at a narrowband/frequency domain position at the same subframe, there are multiple R values in {aggregation level L, repetition times R} of the SS, and the R values are determined according to the coverage levels corresponding to the RAR message.

When only an RAR message corresponding to the same coverage level is used for transmission, a narrowband/frequency domain position of an SS corresponding to DCI for scheduling the RAR message is determined according to the coverage level, and an R value in {L, R} of the SS is determined as one or more R values according to the coverage level.

In the embodiment of the disclosure, the operation of determining the R values according to the coverage levels corresponding to the RAR message includes the following operations:

that there is one-to-one correspondence between the R values and the coverage levels corresponding to the RAR message are determined; or according to a total number of the coverage levels corresponding to the RAR message, it is determined that a total number of the R values is greater than the total number of the coverage levels.

In the embodiment of the disclosure, when the message type is Paging, the method may further include the steps as follows.

Respective time domain positions are used in an SS corresponding to DCI for scheduling a Paging message and in an SS corresponding to DCI for scheduling other messages.

In the embodiment of the disclosure, the operation of using respective time domain positions in an SS includes the following operations:

when different coverage levels use respective SS narrowband positions, respective time domain positions are used in an SS corresponding to DCI for scheduling a Paging message and in an SS corresponding to DCI for scheduling other messages; or when different coverage levels use the same SS narrowband position, respective time domain positions are used in an SS corresponding to DCI for scheduling a Paging message and in an SS corresponding to DCI for scheduling other messages.

In the embodiment of the disclosure, the operation of sending a downlink control channel in an SS includes the operations as follows.

A downlink control channel is sent by using a candidate set position in an SS, and the candidate set uses a value L1 in a set level set L on a frequency domain, and uses a value R1 in a repetition times set R on a time domain.

The sets {L, R} are sent to the terminal by means of a predefined manner or an SIB information configuration manner.

A method for receiving a downlink control channel is provided. The method, applied to a terminal, includes the steps as follows.

One or more SS positions are determined according to at least one of a coverage level and a message type, and a downlink control channel is received in an SS.

Herein, the coverage level at least includes a non-coverage enhancement level CE0 and coverage enhancement levels CE1, CE2 and CE3, the message type at least includes RAR, Paging, RRC and TPC, the SS includes a CSS, a dedicated SS and a non-USS, and the SS position includes a narrowband/frequency domain position, a time domain position and a set position.

In the embodiment of the disclosure, the method may further include the step as follows.

The SS position is determined according to a predefined manner or an SIB information receiving manner.

In the embodiment of the disclosure, the operation of determining an SS position according to a coverage level includes the following operations:

CE1, CE2 and CE3 use respective SS positions; or

CE1, CE2 and CE3 use the same SS position; or

CE1 and CE2 use a first SS position, and CE3 uses a second SS position.

In the embodiment of the disclosure, the operation of determining an SS position according to a coverage level may further include the following operations:

different message types use respective SS positions, and different coverage levels of the same message type also use respective SS positions; or different message types use respective SS positions, and different coverage levels of the same message type use the same SS position.

In the embodiment of the disclosure, the operation of determining an SS position according to a message type includes the following operations:

different message types use respective SS positions; or all message types use the same SS position; or some of the message types use the same SS position.

In the embodiment of the disclosure, when the message type is Paging, the method may further include the steps as follows.

Respective time domain positions are used in an SS corresponding to DCI for scheduling a Paging message and in an SS corresponding to DCI for scheduling other messages.

In the embodiment of the disclosure, the operation of using respective time domain positions in an SS includes the following operations:

when different coverage levels use respective SS narrowband positions, respective time domain positions are used in an SS corresponding to DCI for scheduling a Paging message and in an SS corresponding to DCI for scheduling other messages; or when different coverage levels use the same SS narrowband position, respective time domain positions are used in an SS corresponding to DCI for scheduling a Paging message and in an SS corresponding to DCI for scheduling other messages.

An embodiment of the disclosure also provides a device for sending a downlink control channel. The device, located at a base station side, includes:

a determination unit, configured to determine one or more SS positions according to at least one of a coverage level and a message type; and a first sending unit, configured to send a downlink control channel in an SS.

Herein, the coverage level at least includes a non-coverage enhancement level CE0 and coverage enhancement levels CE1, CE2 and CE3, the message type at least includes RAR, Paging, RRC and TPC, the SS includes a CSS, a dedicated SS and a non-USS, and the SS position includes a narrowband/frequency domain position, a time domain position and a set position.

In the embodiment of the disclosure, the device may further include:

a second sending unit, configured to send the SS position to a terminal by means of a predefined manner or an SIB information configuration manner.

In the embodiment of the disclosure, the determination unit may be further configured to: determine that CE1, CE2 and CE3 use respective SS positions; or determine that CE1, CE2 and CE3 use the same SS position; or determine that CE1 and CE2 use a first SS position, and CE3 uses a second SS position.

In the embodiment of the disclosure, the determination unit may be further configured to: determine that, when CE1, CE2 and CE3 use respective SS positions, CE0 uses a fourth SS position or shares the same SS position with one of CE1, CE2 and CE3; determine that, when CE1, CE2 and CE3 use the same SS position, CE0 uses a fourth SS position or shares the same SS position with CE1, CE2 and CE3; and determine that, when CE1 and CE2 use a first SS position and CE3 uses a second SS position, CE0 uses a fourth SS position or one of the first SS position and the second SS position, wherein any two different SS positions at least contain non-identical PRB resources.

In the embodiment of the disclosure, the determination unit may be further configured to: determine that different message types use respective SS positions and different coverage levels of the same message type also use respective SS positions; or determine that different message types use respective SS positions and different coverage levels of the same message type use the same SS position.

In the embodiment of the disclosure, the determination unit may be further configured to: determine that different message types use respective SS positions; or determine that all message types use the same SS position; or determine that some of the message types use the same SS position.

In the embodiment of the disclosure, the determination unit may be further configured to: determine that different coverage levels use respective SS positions and different message types in the same coverage level use respective SS positions; or determine that different coverage levels use respective SS positions and different message types in the same coverage level use the same SS position; or determine that different coverage levels use respective SS positions and some of the message types in the same coverage level use the same SS position; or determine that different coverage levels use the same SS position and different message types use respective SS positions; or determine that different coverage levels use the same SS position and different message types use the same SS position; or determine that different coverage levels use the same SS position and some of the message types use the same SS position.

In the embodiment of the disclosure, when the message type is an RAR, the determination unit may be further configured to: determine that, in case of mixed transmission of an RAR message corresponding to different coverage levels, an SS corresponding to DCI for scheduling the RAR message is located at a narrowband/frequency domain position at the same subframe, determine that there are multiple R values in {aggregation level L, repetition times R} of the SS, and determine the R values according to the coverage levels corresponding to the RAR message; and determine, when only an RAR message corresponding to the same coverage level is used for transmission, a narrowband/frequency domain position of an SS corresponding to DCI for scheduling the RAR message according to the coverage level, and determine an R value in {L, R} of the SS as one or more R values according to the coverage level.

In the embodiment of the disclosure, the determination unit may be further configured to: determine that there is one-to-one correspondence between the R values and the coverage levels corresponding to the RAR message; or determine that, according to a total number of the coverage levels corresponding to the RAR message, a total number of the R values is greater than the total number of the coverage levels.

In the embodiment of the disclosure, when the message type is Paging, the determination unit may be further configured to: use respective time domain positions in an SS corresponding to DCI for scheduling a Paging message and in an SS corresponding to DCI for scheduling other messages.

In the embodiment of the disclosure, the determination unit may be further configured to: use, when different coverage levels use respective SS narrowband positions, respective time domain positions in an SS corresponding to DCI for scheduling a Paging message and in an SS corresponding to DCI for scheduling other messages; or use, when different coverage levels use the same SS narrowband position, respective time domain positions in an SS corresponding to DCI for scheduling a Paging message and in an SS corresponding to DCI for scheduling other messages.

In the embodiment of the disclosure, the first sending unit may be further configured to: send a downlink control channel by using a candidate set position in the SS, wherein the candidate set uses a value L1 in a set level set L on a frequency domain, and uses a value R1 in a repetition times set R on a time domain; and send the sets {L, R} to the terminal by means of a predefined manner or an SIB information configuration manner.

A device for receiving a downlink control channel is provided. The device, located at a terminal side, includes:

a determination unit, configured to determine one or more SS positions according to at least one of a coverage level and a message type; and a first receiving unit, configured to receive a downlink control channel in an SS.

Herein, the coverage level at least includes a non-coverage enhancement level CE0 and coverage enhancement levels CE1, CE2 and CE3, the message type at least includes RAR, Paging, RRC and TPC, the SS includes a CSS, a dedicated SS and a non-USS, and the SS position includes a narrowband/frequency domain position, a time domain position and a set position.

In the embodiment of the disclosure, the device may further include:

a second receiving unit, configured to determine the SS position according to a predefined manner or an SIB information receiving manner.

In the embodiment of the disclosure, the operation of determining, by the determination unit, an SS position according to a coverage level includes the following operations:

CE1, CE2 and CE3 use respective SS positions; or
CE1, CE2 and CE3 use the same SS position; or
CE1 and CE2 use a first SS position, and CE3 uses a second SS position.

In the embodiment of the disclosure, the operation of determining, by the determination unit, an SS position according to a coverage level may further include the following operations:

different message types use respective SS positions, and different coverage levels of the same message type also use respective SS positions; or different message types use respective SS positions, and different coverage levels of the same message type use the same SS position.

In the embodiment of the disclosure, the step of determining, by the determination unit, an SS position according to a message type includes the following operations:

different message types use respective SS positions; or
all message types use the same SS position; or
some of the message types use the same SS position.

In the embodiment of the disclosure, when the message type is Paging, the determination unit may be further configured to:

use respective time domain positions in an SS corresponding to DCI for scheduling a Paging message and in an SS corresponding to DCI for scheduling other messages.

In the embodiment of the disclosure, the determination unit may be further configured to:

use, when different coverage levels use respective SS narrowband positions, respective time domain positions in an SS corresponding to DCI for scheduling a Paging message and in an SS corresponding to DCI for scheduling other messages; or use, when different coverage levels use the same SS narrowband position, respective time domain positions in an SS corresponding to DCI for scheduling a Paging message and in an SS corresponding to DCI for scheduling other messages.

In the technical solutions of the embodiments of the disclosure, one or more SS positions are determined according to at least one of a coverage level and a message type, and a downlink control channel is sent in an SS, the coverage level at least including a non-coverage enhancement level CE0 and coverage enhancement levels CE1, CE2 and CE3, the message type at least including RAR, Paging, RRC and TPC, the SS including a CSS, a dedicated SS and a non-USS, and the SS position including a narrowband/frequency domain position, a time domain position and a set position. Obviously, different SS positions are distinguished according to a coverage level and/or a message type, and sufficient using resources of DCI for scheduling different common messages can be ensured, thereby avoiding a large delay caused by time-sharing transmission of different common messages.

After the drawings and the detailed descriptions are read and understood, other aspects may be understood.

BRIEF DESCRIPTION OF DRAWINGS

The drawings illustrated herein are intended to provide a further understanding for the present application, and form a part of the present application. The schematic embodiments and illustrations of the present application are intended to explain the present application, and do not form improper limits to the present application. In the drawings.

DETAILED DESCRIPTION

In order to know the features and technical contents of the embodiments of the disclosure in more detail, the implementation of the embodiments of the disclosure will be elaborated below in conjunction with the drawings in detail. The appended drawings are only used for reference, not used to limit the embodiments of the disclosure.

Figure 1:
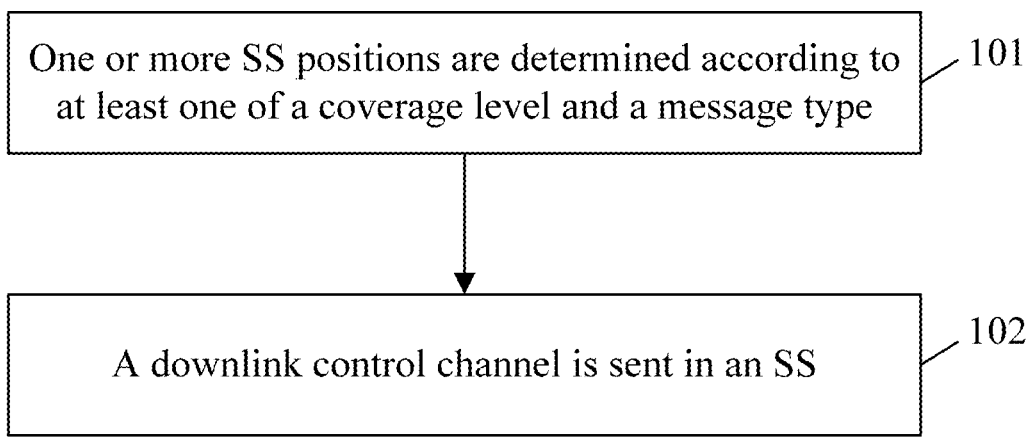
FIG. 1 is a flowchart of a method for sending a downlink control channel according to an embodiment of the disclosure.

FIG. 1 is a flowchart of a method for sending a downlink control channel according to an embodiment of the disclosure. The method for sending a downlink control channel in the present example is applied to a base station. As shown in FIG. 1, the method for sending a downlink control channel includes the steps as follows.

In step 101, one or more SS positions are determined according to at least one of a coverage level and a message type.

Herein, the coverage level at least includes a non-coverage enhancement level CE0 (a low-cost terminal does not have a coverage enhancement demand) and coverage enhancement levels CE1, CE2 and CE3, the message type at least includes RAR, Paging, RRC and TPC, the SS includes a CSS, a dedicated SS and a non-USS, and the SS position includes a narrowband/frequency domain position, a time domain position and a set position.

Here, a coverage enhancement level is distinguished into the above-mentioned coverage enhancement levels CE1, CE2 and CE3 typically, and is also divided into other coverage enhancement levels such as CEx, 0<x<X, X being a positive integer. The message type includes, in addition to the above-mentioned four types, other non-UE-specific message types. The SS includes a CSS (DCI for scheduling all common messages or non-UE-specific messages in a cell can be used), a dedicated SS (DCI for scheduling a certain or some common messages or non-UE-specific messages in a cell can be used) and a non-USS (DCI for scheduling non-UE-specific messages can be used). The SS position includes a narrowband/frequency domain position, a time domain position and a set position. The narrowband position refers to a narrowband position, taking 6PRBs as a unit, of an SS on a frequency domain in one or more subframes. The frequency domain position refers to a frequency domain position, taking 6PRBs or less as a unit, of an SS on a frequency domain in one or more subframes. The time domain position refers to a time position, taking a subframe or radio frame as a unit, of an SS. The set position refers to a frequency domain position, taking specific PRBs as a unit, of an SS configured on a frequency domain, the specific PRBs including 2PRBs, 4PRB and 6PRBs.

In the embodiment of the disclosure, the base station sends the SS position to a terminal by means of a predefined manner or an SIB information configuration manner.

Here, the base station informs the terminal of the SS position by means of a predefined manner or an SIB information configuration manner. For example, the base station predefines division of an SS into two frequency domain or narrowband positions according to each coverage level, wherein CE1 and CE2 use a narrowband position, and CE3 uses another narrowband position. For another example, the base station informs all terminals in a cell of CSS positions by means of SIB message configuration. From t0, the base station informs that different coverage levels or different message types use the same narrowband or frequency domain position in a CSS in a cell by means of SIB, and from t1, the base station informs that different coverage levels use different narrowband or frequency domain positions in a CSS in a cell by means of SIB, wherein CE1 and CE2 use the same narrowband or frequency domain position, and share different narrowband or frequency domain positions with CE3.

In the embodiment of the disclosure, the operation of determining an SS position according to a coverage level includes the following operations:

CE1, CE2 and CE3 use respective SS positions; or

CE1, CE2 and CE3 use the same SS position; or

CE1 and CE2 use a first SS position, and CE3 uses a second SS position.

When CE1, CE2 and CE3 use respective SS positions, CE0 uses a fourth SS position or shares the same SS position with one of CE1, CE2 and CE3.

When CE1, CE2 and CE3 use the same SS position, CE0 uses a fourth SS position or shares the same SS position with CE1, CE2 and CE3.

When CE1 and CE2 use a first SS position and CE3 uses a second SS position, CE0 uses a fourth SS position or one of the first SS position and the second SS position, wherein any two different SS positions at least contain non-identical PRB resources.

Figure 5:
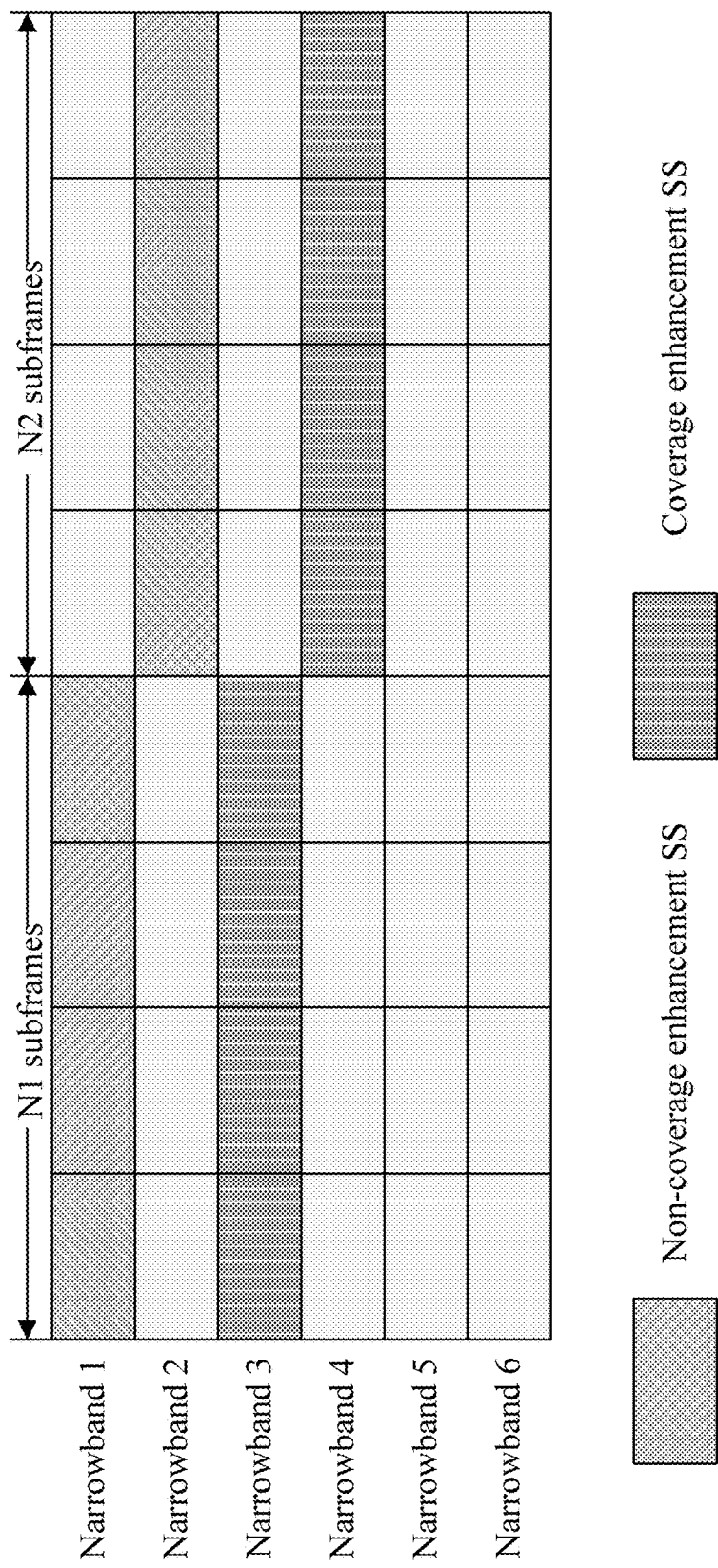
FIG. 5 is a schematic diagram of different SS positions used during non-coverage enhancement or coverage enhancement according to an embodiment of the disclosure.
Figure 6:
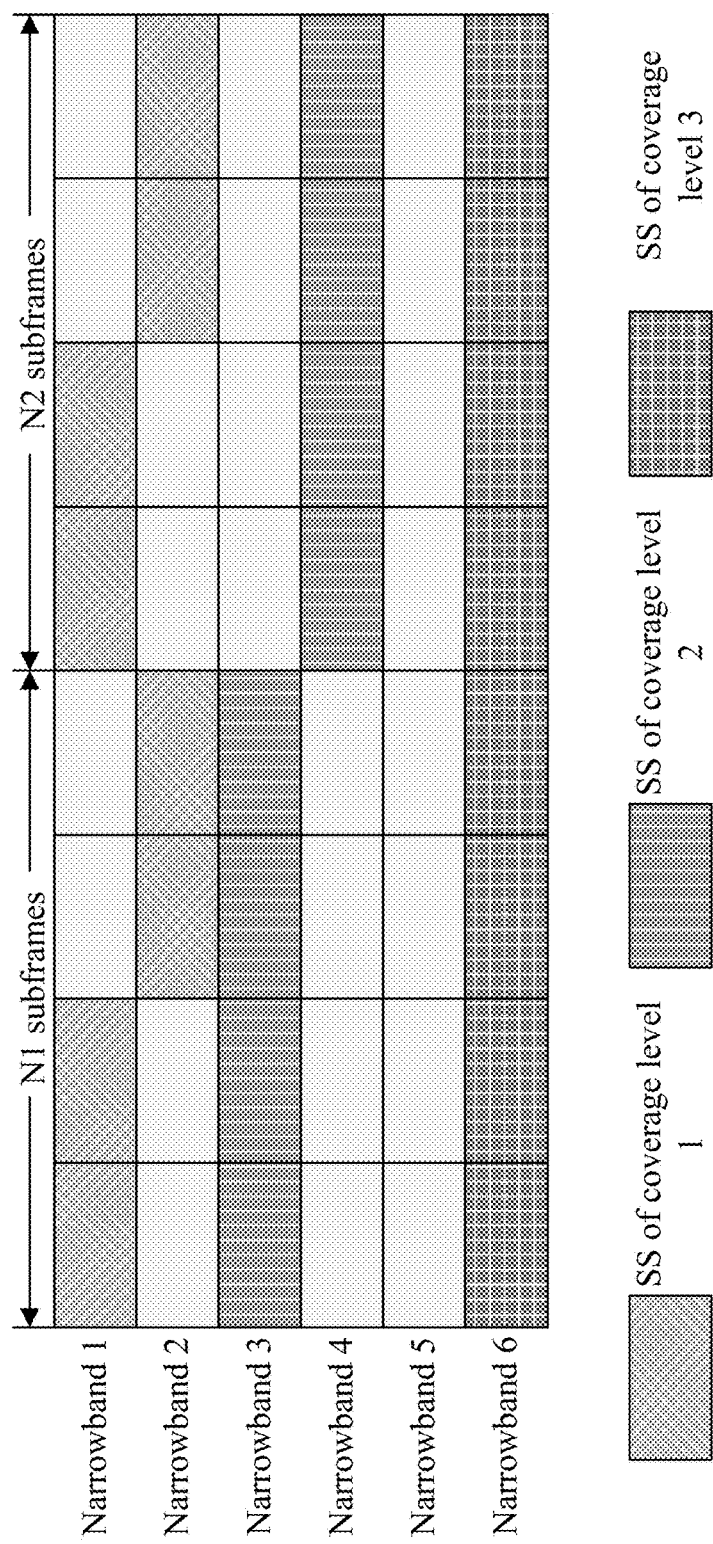
FIG. 6 is a schematic diagram of different SS positions used according to different coverage levels or message types in an embodiment of the disclosure.

Here, the operation of determining an SS position according to a coverage level includes the following operations: CE0 and other CE levels use different SS positions, that is, an SS position used by a non-coverage enhancement MTC terminal is different from an SS position used by a coverage enhancement MTC terminal, as shown in FIG. 5, different narrowband positions or different SS sets are used on a frequency domain; CE1, CE2 and CE3 use different SS positions, that is, all coverage enhancement levels use different SS positions, as shown in FIG. 6, different narrowband positions or different SS sets are used on a frequency domain, and/or different subframe positions are used on a time domain; and CE1, CE2 and CE3 use the same SS position, that is, all coverage enhancement levels use the same SS position, the same narrowband position or the same SS set is used on a frequency domain, and the same subframe position is used on a time domain.

In the embodiment of the disclosure, the operation of determining an SS position according to a coverage level further includes the following operations:

different message types use respective SS positions, and different coverage levels of the same message type also use respective SS positions; or different message types use respective SS positions, and different coverage levels of the same message type use the same SS position.

Here, the operation of determining an SS position according to a coverage level may further include the following operations: different message types use different SSs and the same message type in different coverage levels uses different SS positions, for example, DCI for scheduling an RAR message and an RRC message uses different SSs, and when the RAR message is scheduled, DCI for scheduling an RAR message body consisting of RAR messages of CE2 uses an SS position according to different coverage levels, and DCI for scheduling an RAR message body consisting of RAR messages of CE3 uses another SS position; and different message types use different SSs and different coverage levels of the same message type use the same SS position, for example, DCI for scheduling an RAR message and a TPC message uses different SSs, and when the RAR message is scheduled, DCI for scheduling an RAR message body uses the same SS position according to different coverage levels.

In the embodiment of the disclosure, the operation that CE1, CE2 and CE3 use different SS positions includes the following operations: each CE level uses different SS positions, that is, CE1, CE2 and CE3 use SS positions different from each other, for example, different narrowband positions or different SS sets are used on a frequency domain, and/or different subframe or radio frame positions are used on a time domain; and CE1/2 and CE3 uses different SS positions, and for example, CE1 and CE2 use the same SS position, and share different narrowband positions or different SS sets and/or different subframe or radio frame positions on a time domain with CE3.

In the embodiment of the disclosure, the operation of determining an SS position according to a message type includes the following operations:
different message types use respective SS positions; or
all message types use the same SS position; or
some of the message types use the same SS position.

Here, the operation of determining an SS position according to a message type includes the following operations: different message types use SS positions different from each other, and for example, DCI for scheduling RAR, Paging, RRC and TPC messages is located at SS positions different from each other, specifically such as, different narrowband positions or different SS sets on a frequency domain, and/or different subframe or radio frame positions on a time domain; all message types use the same SS position; and some messages use the same SS position, for example, DCI for scheduling RAR and RRC messages uses the same SS position, and DCI for scheduling Paging and TPC messages uses different SS positions, specifically such as, different narrowband positions or different SS sets on a frequency domain, and/or different subframe or radio frame positions on a time domain.

In the embodiment of the disclosure, the operation of determining an SS position according to a message type may further include the following operations:
different coverage levels use respective SS positions, and different message types in the same coverage level use respective SS positions; or
different coverage levels use respective SS positions, and different message types in the same coverage level use the same SS position; or
different coverage levels use respective SS positions, and some of the message types in the same coverage level use the same SS position; or
different coverage levels use the same SS position, and different message types use respective SS positions; or
different coverage levels use the same SS position, and different message types use the same SS position; or
different coverage levels use the same SS position, and some of the message types use the same SS position.

Here, the operation of determining an SS position according to a message type further includes the operations as follows.

Different coverage levels use different SS positions and different message types in the same coverage level use different SS positions. For example, CE1, CE2 and CE3 use different SS positions, and DCI for scheduling RAR and Paging messages in CE3 uses different SS positions, specifically such as, different narrowband positions or different SS sets on a frequency domain, and/or different subframe or radio frame positions on a time domain.

Different coverage levels use different SS positions and different message types in the same coverage level use the same SS position. For example, CE1, CE2 and CE3 use SS positions different from each other, and DCI for scheduling each common message type in CE2 uses the same SS position, specifically such as, the same narrowband position or the same SS set on a frequency domain, and/or the same subframe or radio frame position on a time domain.

Different coverage levels use different SS positions and some of the message types in the same coverage level use the same SS position. For example, CE1, CE2 and CE3 use different SS positions, and DCI for scheduling RAR and RRC messages in CE3 uses the same SS position, specifically such as, the same narrowband position or the same SS set on a frequency domain, and/or the same subframe or radio frame position on a time domain.

Different coverage levels use the same SS position and different message types use different SS positions. For example, DCI for scheduling RAR and Paging messages uses different SS positions, specifically such as, different narrowband positions or different SS sets on a frequency domain, and/or different subframe or radio frame positions on a time domain, and DCI for scheduling RAR or Paging messages uses the same SS position in different coverage levels.

Different coverage levels use the same SS position and different message types use the same SS position. For example, CE1, CE2 and CE3 use the same SS position, and DCI for scheduling each common message type in any one coverage level uses the same SS position, specifically such as, the same narrowband position or the same SS set on a frequency domain, and/or the same subframe or radio frame position on a time domain.

Different coverage levels use the same SS position and some of the message types use the same SS position. For example, CE1, CE2 and CE3 use the same SS position, and DCI for scheduling some common message types such as RAR and RRC messages in any one coverage level uses the same SS position, specifically such as, the same narrowband position or the same SS set on a frequency domain, and/or the same subframe or radio frame position on a time domain.

In the embodiment of the disclosure, when the message type is an RAR, the method further includes the steps as follows.

During mixed transmission of an RAR message corresponding to different coverage levels, an SS corresponding to DCI for scheduling the RAR message is located at a narrowband/frequency domain position at the same subframe, there are multiple R values in {aggregation level L, repetition times R} of the SS, and the R values are determined according to the coverage levels corresponding to the RAR message.

When only an RAR message corresponding to the same coverage level is used for transmission, a narrowband/frequency domain position of an SS corresponding to DCI for scheduling the RAR message is determined according to the coverage level, and an R value in {L, R} of the SS is determined as one or more R values according to the coverage level.

Here, when the message type is an RAR, in case of mixed transmission of an RAR message corresponding to different coverage levels, an SS corresponding to DCI for scheduling the RAR message body is located at a narrowband/frequency domain position at the same subframe, there are multiple R values in {L, R} of the SS, and the R values are determined according to the coverage levels corresponding to the RAR message. That is, this RAR message body consists of multiple RAR messages corresponding to different coverage levels, and there are multiple R values in {L, R} of the SS corresponding to DCI for scheduling the RAR message body, wherein the quantity of the R values is determined by the quantity of different coverage levels corresponding to RAR messages contained in the RAR message body, and each coverage level corresponds to at least one R value. When only an RAR message corresponding to the same coverage level is used for transmission, a narrowband/frequency domain position of an SS corresponding to DCI for scheduling the RAR message is determined according to the coverage level, and in this case, R in {L, R} of the SS is determined as one or more R values according to the coverage level. That is, this RAR message body consists of multiple RAR messages corresponding to the same coverage level, and there are one or more R values in {L aggregation level, R repetition times} of the SS corresponding to DCI for scheduling the RAR message body, wherein the R values are determined by a coverage level corresponding to RAR messages contained in the RAR message body, and the coverage level corresponds to at least one R value.

In the embodiment of the disclosure, the operation of determining the R values according to the coverage levels corresponding to the RAR message includes the following operations:

that there is one-to-one correspondence between the R values and the coverage levels corresponding to the RAR message are determined; or according to a total number of the coverage levels corresponding to the RAR message, it is determined that a total number of the R values is greater than the total number of the coverage levels.

Here, the operation of determining the R values according to the quantity of coverage levels includes the following operations: that there is one-to-one correspondence between the R values and the coverage levels corresponding to the RAR message are determined, that is, each coverage level in coverage levels corresponding to RAR messages contained in an RAR message body corresponds to an R value; and according to a total number of the coverage levels corresponding to the RAR message, it is determined that a total number of the R values is greater than the total number of the coverage levels, that is, each coverage level in coverage levels corresponding to RAR messages contained in an RAR message body corresponds to at least one R value.

In the embodiment of the disclosure, when the message type is Paging, the method further includes the steps as follows.

Respective time domain positions are used in an SS corresponding to DCI for scheduling a Paging message and in an SS corresponding to DCI for scheduling other messages.

Here, when the message type is Paging, time domain positions of an SS corresponding to DCI for scheduling a Paging message are different from time domain positions of an SS corresponding to DCI for scheduling other messages, that is, subframe or radio frame positions of an SS corresponding to DCI for scheduling a Paging message are different from subframe or radio frame positions of an SS corresponding to DCI for scheduling other messages. For example, DCI for scheduling RAR, RRC and TPC messages uses the same SS position, and DCI for scheduling a Paging message uses different SS positions, and preferably uses different subframe positions on a time domain. Preferably, in a Frequency Division Duplexing (FDD) system, an SS used by DCI for scheduling a Paging message is located in a subframe set {0, 4, 5, 9} or a subset thereof on a delay, and an SS used by DCI for scheduling RAR, RRC and TPC messages is located in a subframe set {1, 2, 3, 6, 7, 8} or a subset thereof on a delay.

In the embodiment of the disclosure, the operation of using respective time domain positions in an SS includes the following operations:

when different coverage levels use respective SS narrowband positions, respective time domain positions are used in an SS corresponding to DCI for scheduling a Paging message and in an SS corresponding to DCI for scheduling other messages; or when different coverage levels use the same SS narrowband position, respective time domain positions are used in an SS corresponding to DCI for scheduling a Paging message and in an SS corresponding to DCI for scheduling other messages.

Here, when different coverage levels use different SS narrowband positions, time domain positions of an SS corresponding to DCI for scheduling a Paging message are different from time domain positions of an SS corresponding to DCI for scheduling other messages. For example, CE1, CE2 and CE3 use SS narrowband positions different from each other, wherein in a certain aggregation level such as CE2, the same SS time domain position used by DCI for scheduling each Paging message type is different from the same SS time domain position used by DCI for scheduling other common message types, the SS time domain position specifically referring to the same subframe or radio frame position on a time domain. When different coverage levels use the same SS narrowband position, time domain positions of an SS corresponding to DCI for scheduling a Paging message are different from time domain positions of an SS corresponding to DCI for scheduling other messages. For example, CE1, CE2 and CE3 use the same SS narrowband position, wherein in a certain aggregation level such as CE2, the same SS time domain position used by DCI for scheduling each Paging message type is different from the same SS time domain position used by DCI for scheduling other common message types, the SS time domain position specifically referring to the same subframe or radio frame position on a time domain.

In step 102, a downlink control channel is sent in an SS.

In the embodiment of the disclosure, the operation of sending a downlink control channel in an SS includes the operations as follows.

A downlink control channel is sent by using a candidate set position in an SS, and the candidate set uses a value L1 in a set level set L on a frequency domain, and uses a value R1 in a repetition times set R on a time domain.

The sets {L, R} are sent to the terminal by means of a predefined manner or an SIB information configuration manner.

Here, the operation of sending a downlink control channel in an SS further includes the following operations: the base station sends a downlink control channel by using a candidate set position in an SS, and the candidate set uses a value L1 in a set level set L on a frequency domain, and uses a value R1 in a repetition times set R on a time domain. In this case, the candidate set in the SS has two dimensionalities namely a time domain and a frequency domain, a set level L1 (L1=24ECCE) occupies ECCE resources on the frequency domain (in this case, L1 occupies 24ECCE, i.e., fully occupies a PRB set of 6PRB), and a repetition times R1 (R1=100) occupies R1 (100) successive available subframe resources. A centralized or distributed transmission manner is used. The base station informs the terminal of the set {L, R} in a predefined manner or an SIB information configuration manner.

By means of the technical solutions of the embodiments of the disclosure, different SS positions are distinguished according to a coverage level and/or a message type, so that sufficient using resources of DCI for scheduling different common messages can be ensured, thereby avoiding a large delay caused by time-sharing transmission of different common messages.

Figure 2:
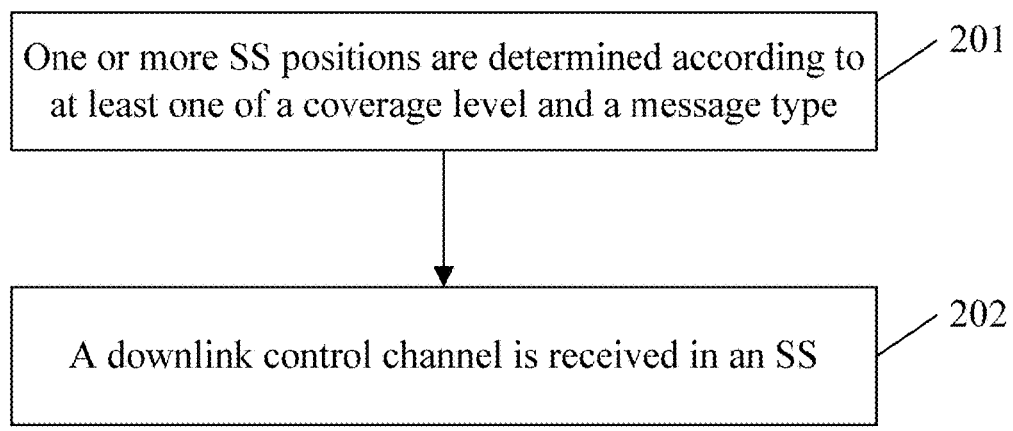
FIG. 2 is a flowchart of a method for receiving a downlink control channel according to an embodiment of the disclosure.

FIG. 2 is a flowchart of a method for receiving a downlink control channel according to an embodiment of the disclosure. The method for receiving a downlink control channel in the present example is applied to a terminal. As shown in FIG. 2, the method for receiving a downlink control channel includes the steps as follows.

In step 201, one or more SS positions are determined according to at least one of a coverage level and a message type.

Herein, the coverage level at least includes a non-coverage enhancement level CE0 and coverage enhancement levels CE1, CE2 and CE3, the message type at least includes RAR, Paging, RRC and TPC, the SS includes a CSS, a dedicated SS and a non-USS, and the SS position includes a narrowband/frequency domain position, a time domain position and a set position.

In the embodiment of the disclosure, the terminal determines the SS position according to a predefined manner or an SIB information receiving manner.

In step 202, a downlink control channel is received in an SS.

A specific determination manner for an SS position in the present example may be understood with reference to the method for sending a downlink control channel as shown in FIG. 1, and will not be elaborated herein.

Figure 3:
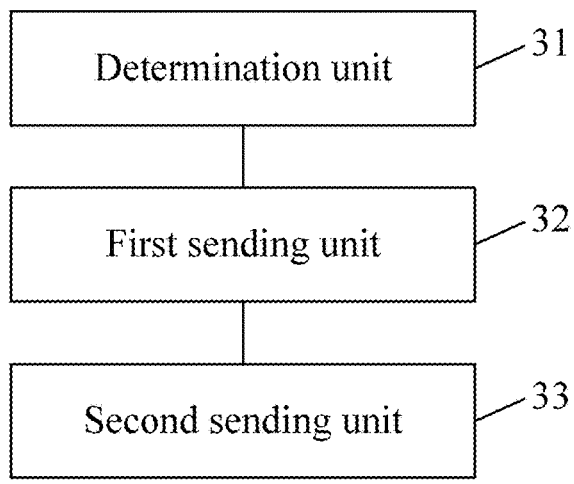
FIG. 3 is a composition structure diagram of a device for sending a downlink control channel according to an embodiment of the disclosure.

FIG. 3 is a composition structure diagram of a device for sending a downlink control channel according to an embodiment of the disclosure. The device in the present example is located at a base station side. As shown in FIG. 3, the device includes a determination unit 31 and a first sending unit 32.

The determination unit 31 is configured to determine one or more SS positions according to at least one of a coverage level and a message type.

The first sending unit 32 is configured to send a downlink control channel in an SS.

Herein, the coverage level at least includes a non-coverage enhancement level CE0 and coverage enhancement levels CE1, CE2 and CE3, the message type at least includes RAR, Paging, RRC and TPC, the SS includes a CSS, a dedicated SS and a non-USS, and the SS position includes a narrowband/frequency domain position, a time domain position and a set position.

The device further includes a second sending unit 33.

The second sending unit 33 is configured to send the SS position to a terminal by means of a predefined manner or an SIB information configuration manner.

The determination unit 31 is further configured to: determine that CE1, CE2 and CE3 use respective SS positions; or determine that CE1, CE2 and CE3 use the same SS position; or determine that CE1 and CE2 use a first SS position, and CE3 uses a second SS position.

The determination unit 31 is further configured to: determine that, when CE1, CE2 and CE3 use respective SS positions, CE0 uses a fourth SS position or shares the same SS position with one of CE1, CE2 and CE3; determine that, when CE1, CE2 and CE3 use the same SS position, CE0 uses a fourth SS position or shares the same SS position with CE1, CE2 and CE3; and determine that, when CE1 and CE2 use a first SS position and CE3 uses a second SS position, CE0 uses a fourth SS position or one of the first SS position and the second SS position, wherein any two different SS positions at least contain non-identical PRB resources.

The determination unit 31 is further configured to: determine that different message types use respective SS positions and different coverage levels of the same message type also use respective SS positions; or determine that different message types use respective SS positions and different coverage levels of the same message type use the same SS position.

The determination unit 31 is further configured to: determine that different message types use respective SS positions; or determine that all message types use the same SS position; or determine that some of the message types use the same SS position.

The determination unit 31 is further configured to: determine that different coverage levels use respective SS positions and different message types in the same coverage level use respective SS positions; or determine that different coverage levels use respective SS positions and different message types in the same coverage level use the same SS position; or determine that different coverage levels use respective SS positions and some of the message types in the same coverage level use the same SS position; or determine that different coverage levels use the same SS position and different message types use respective SS positions; or determine that different coverage levels use the same SS position and different message types use the same SS position; or determine that different coverage levels use the same SS position and some of the message types use the same SS position.

When the message type is an RAR, the determination unit 31 is further configured to: determine that, in case of mixed transmission of an RAR message corresponding to different coverage levels, an SS corresponding to DCI for scheduling the RAR message is located at a narrowband/frequency domain position at the same subframe, determine that there are multiple R values in {aggregation level L, repetition times R} of the SS, and determine the R values according to the coverage levels corresponding to the RAR message; and determine, when only an RAR message corresponding to the same coverage level is used for transmission, a narrowband/frequency domain position of an SS corresponding to DCI for scheduling the RAR message according to the coverage level, and determine an R value in {L, R} of the SS as one or more R values according to the coverage level.

The determination unit 31 is further configured to: determine that there is one-to-one correspondence between the R values and the coverage levels corresponding to the RAR message; or determine that, according to a total number of the coverage levels corresponding to the RAR message, a total number of the R values is greater than the total number of the coverage levels.

When the message type is Paging, the determination unit 31 is further configured to: use respective time domain positions in an SS corresponding to DCI for scheduling a Paging message and in an SS corresponding to DCI for scheduling other messages.

The determination unit 31 is further configured to: use, when different coverage levels use respective SS narrowband positions, respective time domain positions in an SS corresponding to DCI for scheduling a Paging message and in an SS corresponding to DCI for scheduling other messages; or use, when different coverage levels use the same SS narrowband position, respective time domain positions in an SS corresponding to DCI for scheduling a Paging message and in an SS corresponding to DCI for scheduling other messages.

The first sending unit 32 is further configured to: send a downlink control channel by using a candidate set position in the SS, wherein the candidate set uses a value L1 in a set level set L on a frequency domain, and uses a value R1 in a repetition times set R on a time domain; and send the sets {L, R} to the terminal by means of a predefined manner or an SIB information configuration manner.

Those skilled in the art should understand that implementation functions of each unit in the device for sending a downlink control channel as shown in FIG. 3 may be understood with reference to relevant description of the foregoing method for sending a downlink control channel.

Figure 4:
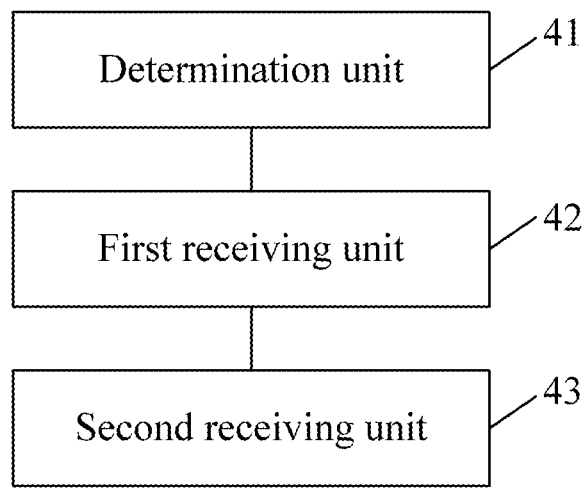
FIG. 4 is a composition structure diagram of a device for receiving a downlink control channel according to an embodiment of the disclosure.

FIG. 4 is a composition structure diagram of a device for receiving a downlink control channel according to an embodiment of the disclosure. The device in the present example is located at a terminal side. As shown in FIG. 4, the device includes a determination unit 41 and a first receiving unit 42.

The determination unit 41 is configured to determine one or more SS positions according to at least one of a coverage level and a message type.

The first receiving unit 42 is configured to receive a downlink control channel in an SS.

Herein, the coverage level at least includes a non-coverage enhancement level CE0 and coverage enhancement levels CE1, CE2 and CE3, the message type at least includes RAR, Paging, RRC and TPC, the SS includes a CSS, a dedicated SS and a non-USS, and the SS position includes a narrowband/frequency domain position, a time domain position and a set position.

The device further includes a second receiving unit 43.

The second receiving unit 43 is configured to determine the SS position according to a predefined manner or an SIB information receiving manner.

Those skilled in the art should understand that implementation functions of each unit in the device for receiving a downlink control channel as shown in FIG. 4 may be understood with reference to relevant description of the foregoing method for receiving a downlink control channel. Simple description is as follows.

In the embodiment of the disclosure, the operation of determining, by the determination unit 41, an SS position according to a coverage level includes the following operations:

CE1, CE2 and CE3 use respective SS positions; or
CE1, CE2 and CE3 use the same SS position; or
CE1 and CE2 use a first SS position, and CE3 uses a second SS position.

In the embodiment of the disclosure, the operation of determining, by the determination unit 41, an SS position according to a coverage level may further include the following operations:

different message types use respective SS positions, and different coverage levels of the same message type also use respective SS positions; or
different message types use respective SS positions, and different coverage levels of the same message type use the same SS position.

In the embodiment of the disclosure, the step of determining, by the determination unit 41, an SS position according to a message type includes the following operations:

different message types use respective SS positions; or
all message types use the same SS position; or
some of the message types use the same SS position.

In the embodiment of the disclosure, when the message type is Paging, the determination unit 41 is further configured to:

use respective time domain positions in an SS corresponding to DCI for scheduling a Paging message and in an SS corresponding to DCI for scheduling other messages.

In the embodiment of the disclosure, the determination unit 41 is further configured to:

use, when different coverage levels use respective SS narrowband positions, respective time domain positions in an SS corresponding to DCI for scheduling a Paging message and in an SS corresponding to DCI for scheduling other messages; or
use, when different coverage levels use the same SS narrowband position, respective time domain positions in an SS corresponding to DCI for scheduling a Paging message and in an SS corresponding to DCI for scheduling other messages.

The technical solutions of the present application are further illustrated below with specific embodiments.

First Embodiment

A base station determines that there are three coverage enhancement levels needed by all MTC terminals in a cell, and the base station determines different CSS positions according to each coverage level.

Each coverage level is subjected to position distinguishing on a frequency domain, CE1 and CE2 use a narrowband 1, and CE3 uses a narrowband 2. Each physical subframe/available subframe has two SS frequency domain positions.

The base station sends, in respective SSs, downlink control channels for bearing control information for scheduling corresponding common messages to MTC terminals corresponding to different coverage enhancement levels. The base station broadcasts {L, R} configuration information of two SSs by means of an SIB message, wherein SSs in the narrowband 1 used by CE1 and CE2 L=8, 24, R=10, 20, 40, 80, and SSs in the narrowband 2 used by CE3 L=24, R=100, 200.

The terminal judges the corresponding SS position according to an own coverage level. A coverage level of an MTC terminal 1 is CE1, a corresponding downlink control channel is blindly detected by a CSS in the narrowband 1 by using L=8, 24, R=10, 20, 40, 80, and the control channel adopts a distributed transmission manner. A coverage level of an MTC terminal 2 is CE3, a corresponding downlink control channel is blindly detected by a CSS in the narrowband 2 by using L=24, R=100, 200, and the downlink control channel adopts a centralized transmission manner.

By means of the method for sending and receiving a downlink control channel provided in the embodiments of the disclosure, different SS positions are distinguished according to a coverage level, so that sufficient using resources of DCI for scheduling different common messages can be ensured, thereby avoiding a large delay caused by time-sharing transmission of different common messages.

Second Embodiment

A base station determines that there are three coverage enhancement levels needed by all MTC terminals in a cell, there may be two groups of common messages namely RAR and RRC messages, and Paging and TPC messages. The base station determines different CSS positions according to different message types.

Different message types are subjected to position distinguishing on a frequency domain, the RAR and RRC messages use a narrowband 1, and the Paging and TPC messages use a narrowband 2. Each subframe has two SS frequency domain positions on a time domain.

The base station sends, in respective SSs, downlink control channels for bearing control information for scheduling different common messages to MTC terminals. {L, R} configuration information of two SSs is determined by means of a predefined manner, wherein SSs in the narrowband 1 L=8, 24, R=10, 20, 100, 200, and SSs in the narrowband 2 L=8, 24, R=10, 20, 100, 200.

The terminal judges a common message needing to be received according to an own state, and further determines a received SS position. When an MTC terminal is in a random access process, corresponding DCI for scheduling an RAR message is blindly detected by a CSS in the narrowband 1 by using L=8, 24, R=10, 20, 40, 80. When an MTC terminal is in an IDLE state, corresponding DCI for scheduling a Paging message is blindly detected by a CSS in the narrowband 2 by using L=8, 24, R=10, 20, 40, 80.

By means of an SS determination method provided in the embodiments of the disclosure, different SS positions are distinguished according to a message type, so that sufficient using resources of DCI for scheduling different common messages can be ensured, thereby avoiding a large delay caused by time-sharing transmission of different common messages.

Third Embodiment

A base station determines that there are three coverage enhancement levels needed by all MTC terminals in a cell, and informs different coverage levels to use the same SS position via an SIB message from t0 for an RAR message. In this case, the base station receives random access messages corresponding to different coverage levels, and sends an RAR message body consisting of RAR messages corresponding to different coverage levels together to different terminals.

DCI corresponding to the RAR message body is transmitted in a CSS or a dedicated SS, L in {L, R} used in the SS is one or two predefined aggregation levels, and there are multiple R values, wherein the quantity of the R values is determined by the quantity of different coverage levels corresponding to the RAR messages contained in the RAR message body, and each coverage level corresponds to at least one R value. For example, CE1 corresponds to R1, CE2 corresponds to R2, CE3 corresponds to R3 and R4, and there are four R values.

A terminal detects DCI for scheduling the RAR message body in the SS according to a coverage level. If an MTC terminal 1 is in a coverage level 1, the DCI is blindly detected by using R1. If an MTC terminal 2 is in a coverage level 3, the DCI is blindly detected by using R3 and R4.

By means of an SS determination method provided in the embodiments of the disclosure, an SS position is determined according to a certain message type, so that sufficient using resources of DCI for scheduling common messages in different coverage levels can be ensured, thereby avoiding a large delay caused by time-sharing transmission of common messages in different coverage levels.

Fourth Embodiment

A base station determines that there are three coverage enhancement levels needed by all MTC terminals in a cell, there may be two groups of common messages namely RAR, RRC and TPC messages, and a Paging message. The base station determines different CSS positions according to different message types.

For example, DCI for scheduling the RAR, RRC and TPC messages uses the same SS position, and DCI for scheduling the Paging message uses different SS positions, and preferably uses different subframe positions on a time domain. Preferably, an SS used by DCI for scheduling the RAR, RRC and TPC messages is located in a subframe set {1, 2, 3, 6, 7, 8} or a subset thereof on a delay.

Different message types are subjected to position distinguishing on a time domain. In an FDD system, an SS used by DCI for scheduling the RAR, RRC and TPC messages is located in a subframe set {1, 2, 3, 6, 7, 8} or a subset thereof on a delay, and an SS used by DCI for scheduling the Paging message is located in a subframe set {0, 4, 5, 9} or a subset thereof on a delay. The two SS frequency domain positions are the same at different subframe positions.

The base station transmits DCI for different common messages to an MTC terminal in respective SSs.

The terminal judges a common message needing to be received according to an own state, and further determines a received SS position. When the MTC terminal needs to receive an RRC message, the corresponding RRC message is detected in a subframe set {1, 2, 3, 6, 7, 8} in an SS 1. When the MTC terminal needs to receive a Paging message, the corresponding Paging message is detected in a subframe set {0, 4, 5, 9} in an SS 2.

By means of an SS determination method provided in the embodiments of the disclosure, different SS positions are distinguished according to a message type, so that sufficient using resources of DCI for scheduling different common messages can be ensured, and particularly, the utilization rate of resources is improved for a message type corresponding to not all of subframes.

Fifth Embodiment

A base station determines that there are three coverage enhancement levels needed by all MTC terminals in a cell, and the base station determines different CSS positions according to a non-coverage enhancement level and three coverage enhancement levels.

Each coverage level is subjected to position distinguishing on a frequency domain, CE0 uses a narrowband 1, and CE1, CE2 and CE3 uses a narrowband 2. Each physical subframe/available subframe has two SS frequency domain positions.

The base station sends, in respective SSs, downlink control channels for bearing control information for scheduling corresponding common messages to MTC terminals corresponding to different coverage enhancement levels. The base station broadcasts {L, R} configuration information of two SSs by means of an SIB message, wherein SSs in the narrowband 1 used by CE0 L=4, 8, 16, 24, R=1, and SSs in the narrowband 2 used by CE1, CE2 and CE3 L=8, 24, R=10, 20, 100, 200.

The terminal judges the corresponding SS position according to an own coverage level. A coverage level of an MTC terminal 1 is CE0, namely a non-coverage enhancement scenario, a corresponding downlink control channel is blindly detected by a CSS in the narrowband 1 by using L=4, 8, 16, 24, R=1, and the control channel adopts a centralized or distributed transmission manner. A coverage level of an MTC terminal 2 is CE2, a corresponding downlink control channel is blindly detected by a CSS in the narrowband 2 by using L=8, 24, R=10, 20, 100, 200, and the downlink control channel adopts a centralized transmission manner.

By means of the method for sending and receiving a downlink control channel provided in the embodiments of the disclosure, different SS positions are distinguished according to coverage enhancement and non-coverage enhancement, so that sufficient using resources of DCI for scheduling common messages of a terminal during non-coverage enhancement can be ensured, thereby avoiding a large transmission delay of DCI for scheduling common message during non-coverage enhancement due to occupation of a CSS during coverage enhancement repeated transmission.

The technical solutions in the embodiments of the disclosure may be randomly combined under the condition of no conflicts.

In several embodiments provided by the present application, it will be appreciated that the disclosed method and smart equipment may be implemented in another manner. The equipment embodiment described above is only schematic. For example, division of the units is only division of logical functions, and there may be additional division manners during practical implementation. For example, multiple units or assemblies may be combined or integrated to another system, or some characteristics may be omitted or may be not executed. In addition, coupling or direct coupling or communication connection between displayed or discussed components may be indirect coupling or communication connection, implemented through some interfaces, of the equipment or the units, and may be electrical and mechanical or adopt other forms.

The above-mentioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be integrated into a second processing unit, each unit may also exist independently, and two or more than two units may also be integrated into a unit. The integrated unit may be implemented in a hardware form, and may also be implemented in form of hardware and software function unit.

The above is only the detailed description of the disclosure, but the scope of protection of the disclosure is not limited thereto. As will occur to those skilled in the art, the disclosure is susceptible to changes or replacements within the technical scope of the disclosure. These changes or replacements should fall within the scope of protection of the disclosure.

INDUSTRIAL APPLICABILITY

In the present application, a base station determines one or more SS positions according to at least one of a coverage level and a message type, and sends a downlink control channel in an SS, the coverage level at least including a non-coverage enhancement level CE0 and coverage enhancement levels CE1, CE2 and CE3, the message type at least including RAR, Paging, RRC and TPC, the SS including a CSS, a dedicated SS and a non-USS, and the SS position including a narrowband/frequency domain position, a time domain position and a set position. The present application can at least ensure sufficient using resources of DCI for scheduling different common messages, thereby avoiding a large delay caused by time-sharing transmission of different common messages.

The invention claimed is:

1. A method for sending a downlink control channel, applied to a base station, the method comprising:
   determining one or more Search Space (SS) positions according to at least one of a coverage level or a message type, and sending a downlink control channel in an SS,
   the coverage level comprising a non-coverage enhancement level CE0 and coverage enhancement levels CE1, CE2 and CE3, the message type comprising at least one of Random Access Response (RAR), Paging or Transmission Power Control (TPC), the SS comprising at least one of a Common Search Space (CSS) or a User Equipment (UE) dedicated SS, and the one or more SS positions comprising at least one of a narrowband/frequency domain position or a time domain position;
   wherein determining an SS position according to a coverage level comprises:
   determining that CE1, CE2 and CE3 use respective SS positions; or
   determining that CE1, CE2 and CE3 use the same SS position;
   wherein determining an SS position according to a coverage level further comprises:
   determining that, when CE1, CE2 and CE3 use respective SS positions, CE0 uses a fourth SS position or shares the same SS position with one of CE1, CE2 and CE3; and
   determining that, when CE1, CE2 and CE3 use the same SS position, CE0 uses a fourth SS position or shares the same SS position with CE1, CE2 and CE3;
   wherein Physical Resource Block (PRB) resources contained in any two different SS positions are at least partially different.

2. The method for sending a downlink control channel according to claim 1, further comprising:
   sending the SS position to a terminal by means of a predefined manner or a System Information Block (SIB) information configuration manner.

3. The method for sending a downlink control channel according to claim 1, wherein determining an SS position according to a coverage level further comprises:
   determining that different message types use respective SS positions and different coverage levels of the same message type also use respective SS positions; or
   determining that different message types use respective SS positions and different coverage levels of the same message type use the same SS position.

4. The method for sending a downlink control channel according to claim 1, wherein determining an SS position according to a message type comprises:
   determining that different message types use respective SS positions; or
   determining that all message types use the same SS position; or determining that some of the message types use the same SS position.

5. The method for sending a downlink control channel according to claim 4, wherein determining an SS position according to a message type further comprises:
determining that different coverage levels use respective SS positions and different message types in the same coverage level use respective SS positions; or
determining that different coverage levels use respective SS positions and different message types in the same coverage level use the same SS position; or
determining that different coverage levels use respective SS positions and some of the message types in the same coverage level use the same SS position; or
determining that different coverage levels use the same SS position and different message types use respective SS positions; or
determining that different coverage levels use the same SS position and different message types use the same SS position; or
determining that different coverage levels use the same SS position and some of the message types use the same SS position.

6. The method for sending a downlink control channel according to claim 5, wherein when the message type is an RAR, the method further comprises:
determining that, in case of mixed transmission of an RAR message corresponding to different coverage levels, an SS corresponding to Downlink Control Information (DCI) for scheduling the RAR message is located at a narrowband/frequency domain position at the same subframe, determining that there are a plurality of R values in {aggregation level L, repetition times R} of the SS, and determining the R values according to the coverage levels corresponding to the RAR message; and
determining, when only an RAR message corresponding to the same coverage level is used for transmission, a narrowband/frequency domain position of an SS corresponding to DCI for scheduling the RAR message according to the coverage level, and determining an R value in {L, R} of the SS as one or more R values according to the coverage level.

7. The method for sending a downlink control channel according to claim 6, wherein determining the R values according to the coverage levels corresponding to the RAR message comprises:
determining that there is one-to-one correspondence between the R values and the coverage levels corresponding to the RAR message; or
determining that, according to a total number of the coverage levels corresponding to the RAR message, a total number of the R values is greater than the total number of the coverage levels.

8. The method for sending a downlink control channel according to claim 4, wherein when the message type is Paging, the method further comprises:
using respective time domain positions in an SS corresponding to DCI for scheduling a Paging message and in an SS corresponding to DCI for scheduling other messages.

9. The method for sending a downlink control channel according to claim 8, wherein using respective time domain positions in the SSs comprises:
using, when different coverage levels use respective SS narrowband positions, respective time domain positions in an SS corresponding to DCI for scheduling a Paging message and in an SS corresponding to DCI for scheduling other messages; or
using, when different coverage levels use the same SS narrowband position, respective time domain positions in an SS corresponding to DCI for scheduling a Paging message and in an SS corresponding to DCI for scheduling other messages.

10. A method for receiving a downlink control channel, applied to a terminal, the method comprising:
determining one or more Search Space (SS) positions according to at least one of a coverage level or a message type, and receiving a downlink control channel in an SS,
the coverage level comprising a non-coverage enhancement level CE0 and coverage enhancement levels CE1, CE2 and CE3, the message type comprising at least one of Random Access Response (RAR), Paging or Transmission Power Control (TPC), the SS comprising at least one of a Common Search Space (CSS) or a User Equipment (UE) dedicated SS, and the one or more SS positions comprising at least one of a narrowband/frequency domain position or a time domain position;
wherein determining an SS position according to a coverage level comprises:
determining that CE1, CE2 and CE3 use respective SS positions; or
determining that CE1, CE2 and CE3 use the same SS position;
wherein determining an SS position according to a coverage level further comprises:
determining that, when CE1, CE2 and CE3 use respective SS positions, CE0 uses a fourth SS position or shares the same SS position with one of CE1, CE2 and CE3; and
determining that, when CE1, CE2 and CE3 use the same SS position, CE0 uses a fourth SS position or shares the same SS position with CE1, CE2 and CE3;
wherein Physical Resource Block (PRB) resources contained in any two different SS positions are at least partially different.

11. The method for receiving a downlink control channel according to claim 10, further comprising:
determining the SS position according to a predefined manner or a System Information Block (SIB) information receiving manner.

12. The method for receiving a downlink control channel according to claim 10, wherein determining an SS position according to a coverage level further comprises:
determining that different message types use respective SS positions and different coverage levels of the same message type also use respective SS positions; or
determining that different message types use respective SS positions and different coverage levels of the same message type use the same SS position.

13. The method for receiving a downlink control channel according to claim 10, wherein determining an SS position according to a message type comprises:
determining that different message types use respective SS positions; or
determining that all message types use the same SS position; or
determining that some of the message types use the same SS position.

14. The method for receiving a downlink control channel according to claim 13, wherein when the message type is Paging, the method further comprises:

using respective time domain positions in an SS corresponding to Downlink Control Information (DCI) for scheduling a Paging message and in an SS corresponding to DCI for scheduling other messages.

15. The method for receiving a downlink control channel according to claim 14, wherein using respective time domain positions in an SS comprises:
using, when different coverage levels use respective SS narrowband positions, respective time domain positions in an SS corresponding to DCI for scheduling a Paging message and in an SS corresponding to DCI for scheduling other messages; or
using, when different coverage levels use the same SS narrowband position, respective time domain positions in an SS corresponding to DCI for scheduling a Paging message and in an SS corresponding to DCI for scheduling other messages.

16. A device for receiving a downlink control channel, located at a terminal side, the device comprising:
a determination unit, configured to determine one or more Search Space (SS) positions according to at least one of a coverage level or a message type; and
a first receiving unit, configured to receive a downlink control channel in an SS,
the coverage level comprising a non-coverage enhancement level CE0 and coverage enhancement levels CE1, CE2 and CE3, the message type comprising at least one of Random Access Response (RAR), Paging or Transmission Power Control (TPC), the SS comprising at least one of a Common Search Space (CSS) or a User Equipment (UE) dedicated SS, and the one or more SS positions comprising at least one of a narrowband/frequency domain position or a time domain position;
wherein the determination unit is further configured to determine that CE1, CE2 and CE3 use respective SS positions; or determine that CE1, CE2 and CE3 use the same SS position;
wherein the determination unit is further configured to determine that, when CE1, CE2 and CE3 use respective SS positions, CE0 uses a fourth SS position or shares the same SS position with one of CE1, CE2 and CE3, and when CE1, CE2 and CE3 use the same SS position, CE0 uses a fourth SS position or shares the same SS position with CE1, CE2 and CE3;
wherein Physical Resource Block (PRB) resources contained in any two different SS positions are at least partially different.

17. The device for receiving a downlink control channel according to claim 16, further comprising:
a second receiving unit, configured to determine the SS position according to a predefined manner or a System Information Block (SIB) information receiving manner.

* * * * *